(12) United States Patent
Saha et al.

(10) Patent No.: US 12,254,429 B2
(45) Date of Patent: Mar. 18, 2025

(54) GENERATING STATUS OF CONSTRUCTION SITE BASED ON HIERARCHICAL MODELING THAT STANDARDIZES PHYSICAL RELATIONSHIPS OF ELEMENTS OF A STRUCTURE

(71) Applicant: DOXEL, INC., Palo Alto, CA (US)

(72) Inventors: Arunava Saha, Dublin, CA (US); Dobromir Voyager Montauk, Redwood City, CA (US); Richard William Turner, Ann Arbor, MI (US); Matthew Paul Orban, San Bruno, CA (US)

(73) Assignee: Doxel, Inc., Palo Alto, CA (US)

( * ) Notice: Subject to any disclaimer, the term of this patent is extended or adjusted under 35 U.S.C. 154(b) by 198 days.

(21) Appl. No.: 17/804,758

(22) Filed: May 31, 2022

(65) Prior Publication Data

US 2022/0383231 A1 Dec. 1, 2022

Related U.S. Application Data

(60) Provisional application No. 63/194,873, filed on May 28, 2021.

(51) Int. Cl.
*G06Q 10/06* (2023.01)
*G06Q 10/0631* (2023.01)
(Continued)

(52) U.S. Cl.
CPC . *G06Q 10/063114* (2013.01); *G06Q 30/0283* (2013.01); *G06Q 50/08* (2013.01)

(58) Field of Classification Search
CPC ....... G06Q 10/063114; G06Q 30/0283; G06Q 50/08
See application file for complete search history.

(56) References Cited

U.S. PATENT DOCUMENTS

2006/0044307 A1* 3/2006 Song .................. G06T 11/206
345/419
2006/0074608 A1* 4/2006 Clay .................. G06Q 10/06
703/1
(Continued)

FOREIGN PATENT DOCUMENTS

CN 102884532 B * 6/2022 ........... G06F 16/178

OTHER PUBLICATIONS

Translation of CN102884532B (Year: 2022).*
(Continued)

*Primary Examiner* — Mehmet Yesildag
*Assistant Examiner* — Jeremy L Gunn
(74) *Attorney, Agent, or Firm* — Perkins Coie LLP; Alberto Araiza; Lena Petrovic

(57) ABSTRACT

Systems and methods for evaluating construction of structures are disclosed. Building information modeling (BIM) data is received in a non-standardized format for a set of structures undergoing construction. Scheduling data is received associated with construction of each structure in the set of structures. A database is accessed that stores construction data that associates multiple elements of construction projects in a hierarchical configuration. Using the BIM data and the scheduling data, a model is generated that standardizes how particular elements of a particular structure relate to the multiple elements in the hierarchical configuration. Using the generated model, a status of construction of the particular structure is generated. In some implementations, the model is generated and/or trained using machine learning. In some implementations, the model further standardizes relationships between construction activities for the particular structure and construction activities represented in the hierarchical configuration.

18 Claims, 9 Drawing Sheets

(51) Int. Cl.
*G06Q 30/0283* (2023.01)
*G06Q 50/08* (2012.01)

(56) References Cited

U.S. PATENT DOCUMENTS

| | | | |
|---|---|---|---|
| 2018/0012125 A1* | 1/2018 | Ladha | G06N 3/044 |
| 2019/0325089 A1* | 10/2019 | Golparvar-Fard | G06T 19/003 |
| 2020/0279364 A1* | 9/2020 | Sarkisian | G06F 16/252 |
| 2021/0342962 A1* | 11/2021 | Budlong | G06Q 10/06 |
| 2022/0198709 A1* | 6/2022 | Sudry | G06F 30/12 |
| 2022/0292230 A1* | 9/2022 | Murphy | G06F 30/27 |
| 2022/0391627 A1* | 12/2022 | Powles | G06Q 10/103 |
| 2023/0162083 A1* | 5/2023 | Gardner | G06N 20/00 706/12 |

OTHER PUBLICATIONS

Y. Srewil and R. J. Scherer, "Construction objects recognition in framework of CPS," 2017 Winter Simulation Conference (WSC), Las Vegas, NV, USA, 2017, pp. 2472-2483 (Year: 2017).*

* cited by examiner

GENERATING STATUS OF CONSTRUCTION SITE BASED ON HIERARCHICAL MODELING THAT STANDARDIZES PHYSICAL RELATIONSHIPS OF ELEMENTS OF A STRUCTURE

CROSS-REFERENCE TO RELATED APPLICATION

This application claims priority to U.S. Provisional Patent Application No. 63/194,873, filed on May 28, 2021, the contents of which are hereby incorporated by reference in their entirety.

TECHNICAL FIELD

The disclosed teachings generally relate to evaluating construction of physical structures.

BACKGROUND

Constructing complex structures, such as buildings, requires the proper installation or assembly of many components. Construction workers need to properly locate and install or assemble numerous components, such as beams, pipes, ducts, studs, walls, etc. For example, some complex structures have millions of components that need to be installed at a location within an accuracy of an eighth of an inch, or even less in some cases. Unfortunately, the construction process is subject to errors, which can cause significant amounts of re-work and schedule delays. For example, a wall may be installed at a wrong location. If the error is not detected in a timely fashion, a significant amount of re-work may result. For example, a plumber may run water lines through the improperly located wall, an electrician may run electrical wires through the improperly located wall, a carpenter may add sheetrock to the improperly located wall, etc. When the error is detected, the wall may need to be demolished and rebuilt in the proper location in order to rectify the error, and the water lines, electrical wires, and sheetrock, may need to be reinstalled. Such errors may cause significant schedule delays and may result in significant additional costs for the construction project. Similar issues exist in the construction of other complex structures, such as airplanes, ships, submarines, space vehicles, etc.

Additionally, contractors and/or owners face difficult technical challenges related to monitoring and evaluating construction projects. For example, existing systems do not allow for construction data for multiple projects to be standardized for an apples-to-apples comparison across multiple projects. Furthermore, existing systems do not allow for efficient collection and comparison of status data for multiple construction projects, such as projects that may be geographically distant. These and other problems make it difficult for contractors and/or owners to make timely evaluations of construction projects, such as real time or near-real time evaluations.

BRIEF DESCRIPTION OF THE DRAWINGS

Various features and characteristics of the technology will become more apparent to those skilled in the art from a study of the Detailed Description in conjunction with the drawings. Embodiments of the technology are illustrated by way of example and not limitation in the drawings, in which like references may indicate similar elements.

Figure 1:
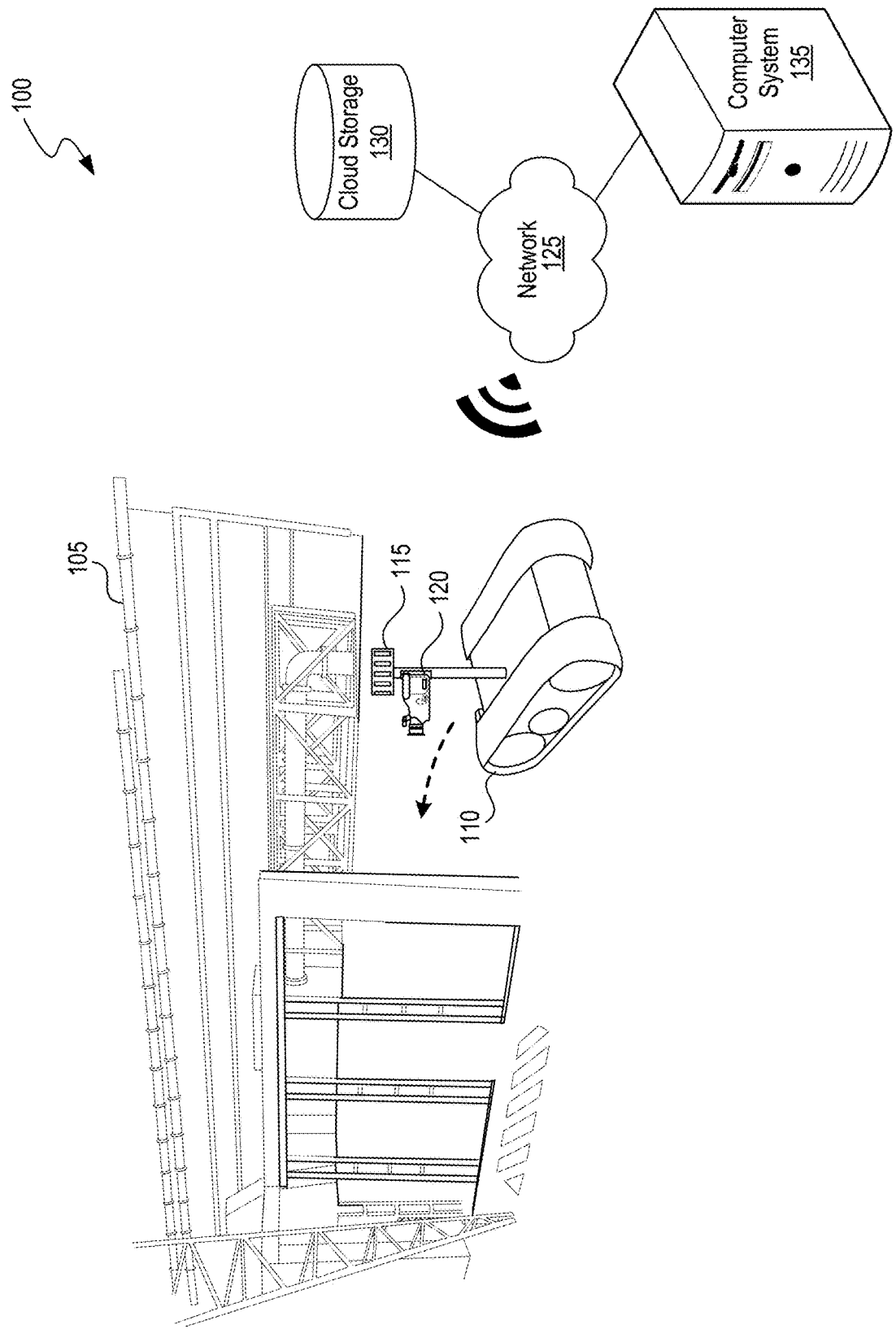
FIG. 1 is a system diagram that illustrates an environment in which a construction monitoring system is implemented.

The technologies described herein will become more apparent to those skilled in the art from studying the Detailed Description in conjunction with the drawings. Embodiments or implementations describing aspects of the technology are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Disclosed herein are systems and methods to evaluate construction of structures using a model that standardizes relationships between elements of a structure and corresponding elements of structures stored in a hierarchical configuration. The systems and methods further standardize relationships between construction activities associated with the elements of the structure and corresponding construction activities represented in the hierarchical configuration. In some implementations, the evaluations can be performed in real time or near-real time. As used herein, "real time" or "near-real time" includes operations that are performed in a short amount of time, such as milliseconds or minutes, such as evaluating progress of a construction project on a particular day and based on status data collected on that day (e.g., minutes before the evaluation). To standardize the relationships between the elements of the structure and the elements in the hierarchical configuration and/or the relationships between the construction activities and corresponding construction activities represented in the hierarchical configuration, the disclosed technology identifies a construction pattern from multiple construction sites to generate a computer model that is representative of the multiple construction sites. The basic building blocks of that pattern include functional and structural object types that are encoded hierarchically in a catalog of parts at a higher abstraction level (e.g., trade, system, subsystem) to draw commonality across sites and types of construction. Additionally, the hierarchical configuration can store data related to construction activities associated with elements of structures, such as scheduling information (e.g., sequencing or timing of construction activities), price or cost information, quality control information, standards for installation or placement of elements (e.g., components or subcomponents), and so forth. For example, data related to construction activities can include pressure testing information for a pipe, proper placement of insulation, or torque values for fasteners. Generally speaking, the hierarchical configuration can store and/or model elements of structures and construction activities associated with elements and/or structures. The hierarchical configuration can further store metadata associated with elements, structures, and/or construction activities.

The hierarchical configuration represents relationships among types in a form of a N-ary tree of varying depths, the relationships in which low level objects (e.g., elements) and related construction activities can be rolled up to a higher level to track a construction project at different resolutions. The hierarchical configuration also represents product workflows in a form of directed acyclic graphs in which edges connecting objects represent relation or decision flow. Some of the edges represent a complex experience of construction experts based on rules-based and artificial intelligence (AI) based systems. Obtaining the construction pattern from the multiple construction sites to generate the computer model includes identifying functional and structural object types as basic building blocks of a hierarchical ontology, representing relationships among object types, and specifying product workflows that represent relation or decision flow among object types. The process includes comparing patterns observed from construction sites to draw commonalities across the construction sites. Examples of commonalities may include physical quantifiable elements, such as pipes, ducts, valves, and walls used for construction. Other examples may include stages of construction which define quantifiable progress measurement of individual complex components as well as cumulative progress indicators of a construction site. The process includes generating a single computer model that is representative of the plurality of construction sites based on the commonalities identified through comparison of the patterns. In some implementations, models generated using the disclosed technology can comprise and/or be generated using machine learning models.

The disclosed system receives building information modeling (BIM) data for a set of structures undergoing construction, which is in a non-standardized format. The BIM data includes digital drawings, such as computer-aided drafting (CAD) files, of elements of the structures. The disclosed system also receives scheduling data associated with construction of each structure in the set of structures, which includes expected progress of construction at different points in time, such as a sequence of construction activities. The system accesses a database that stores construction data that associates multiple elements of construction projects and construction activities in a hierarchical configuration. The hierarchical configuration can have a tree structure that defines branches each having one or more types of elements and/or construction activities, such as a group and a system, a subsystem, a component, or a subcomponent at respective levels, and the hierarchical configuration further defines paths between the levels of the branches. Based on at least the BIM data and the scheduling data, the system generates a model that standardizes how particular elements of a particular structure relate to the multiple elements in the hierarchical configuration. Additionally, the model can standardize relationships between construction activities associated with the particular structure and construction activities represented in the hierarchical configuration. Using the generated model, the system can perform various actions and/or operations related to the construction of the particular structure, such as generating a status of construction and/or evaluating construction of the structure.

Advantages of the disclosed technology include improving the productivity of constructing buildings and improved ability to evaluate the construction of buildings. For example, the disclosed technology can be used to evaluate construction of multiple buildings that are physically distant from one another in real time or near-real time. Additionally, the disclosed technology can be used to calculate or estimate progress of construction, predict delays in construction, evaluate costs of construction (e.g., for a whole site, for a system or subsystem, for a portion of a structure, for a delay or change order), calculate risk of delay (e.g., a percent probability that a project or portion thereof will be delayed), assess damages due to a delay, make recommendations based on evaluations, and so forth. This patent application makes use of concepts that have appeared in U.S. patent application Ser. No. 15/610,310, titled "Monitoring Construction of a Structure" and U.S. patent application Ser. No. 16/680,377, titled "Tracking an Ongoing Construction by Using Fiducial Markers", each of which are incorporated herein by reference in their entireties for all purposes.

Various embodiments of the software and/or hardware facilities are described below. The following description provides specific details for a thorough understanding and enabling description of these embodiments. One skilled in the art will understand that the software and/or hardware facilities may be practiced without many of these details. Additionally, some well-known structures or functions may not be shown or described in detail, so as to avoid unnecessarily obscuring of the relevant description of the various embodiments.

The terminology used in the description presented is intended to be interpreted in its broadest reasonable manner, even though it is being used in conjunction with a detailed description of certain specific embodiments of the software and/or hardware facilities. Certain terms may even be emphasized below; however, any terminology intended to be interpreted in any restricted manner will be overtly and specifically defined as such in this Detailed Description section.

FIG. 1 is a system diagram illustrating an environment 100 in which a construction monitoring system may be implemented according to some embodiments of the present disclosure. In environment 100 of FIG. 1, robot 110 is traversing a construction site. Robot 110 navigates around building 105 and other portions of the construction site in order to obtain sensor readings related to physical properties associated with the construction project. For example, robot 110 obtains sensor readings of some or all of building 105. While a robot is used in this example, any of various methods can be utilized to obtain sensor readings related to the construction project. For example, a drone that includes a sensor can be utilized to autonomously navigate around the construction site and take sensor readings. In another example, a person with a backpack that contains a sensor can walk around the construction site and take sensor readings. In some implementations, the sensor readings can be taken using helmet-mounted cameras or other wearable devices or connected devices (e.g., Internet of things (IoT) devices), mobile devices (e.g., smartphones or tablets), static or semi-static cameras or other devices (e.g., wall-mounted cameras), and so forth.

In the example of FIG. 1, robot 110 traverses a path that is optimized to efficiently obtain sensor readings of all accessible portions of building 105. In some embodiments, robot 110 also traverses and obtains sensor readings of areas outside of building 105. For example, robot 110 may obtain sensor readings of landscape (to monitor development progress of landscaping), a sports facility (to monitor construction progress of, e.g., a basketball court, tennis court, pool, etc.), another building (to monitor construction progress of the other building), a parking lot or parking structure (to monitor construction progress of the parking lot or structure), etc.

As part of the construction project, a project design team, with team members such as architects, structural engineers, mechanical engineers, electrical engineers, etc., developed plans for the construction project, including design plans for the various components associated with building 105. The components can include, for example, structural beams, floors, flooring, walls, plumbing, electrical wiring, fire sprinklers, door frames and doors, external windows, internal windows, bathrooms, computer centers, surgery centers, lighting, landscaping, air conditioners, ducts, water heaters, water filtration systems, gyms, cafeterias, cabinets, closets, security systems, bulk heads, water tight doors, engines, propellers, etc. The design team sets the design of the construction project via one or more CAD applications.

Some CAD applications may inherently support 3D design capture and visualization, while others may not. Where 3D analysis is required and a CAD application does not inherently support 3D views, the CAD application can store data needed to generate a 3D view, such as elevation, depth, etc. of various components, which can be utilized to determine 3D locations of the components. Data derived from the design plan data, which can be or include the design plan data, can be stored at cloud storage 130, can be stored at storage local to the robot 110, or can be stored at other locations.

Robot 110 has access to design plan data and is able to utilize the design plan data to generate a 3D representation of building 105, and is able to navigate around building 105 by use of the 3D representation. For example, a computer, which can be physically coupled to robot 110, or can be remote, can correlate features of building 105, as determined based on sensor readings of building 105, with features of the design plans of building 105, and can use the design plans to navigate around building 105, taking into account that the construction of building 105 is only partially complete. In some embodiments, robot 110 is able to navigate around building 105 without having access to a 3D representation of building 105. For example, the boundaries of building 105 can be input to robot 110, the coordinates of a geo-fence can be transmitted to robot 110, etc., and robot 110 can use a navigation system, such as based on global position satellites (GPS) or autonomous navigation capabilities, to traverse the building 105 or of any other area related to the construction project.

As the robot 110 traverses the construction site, robot 110 uses its sensors, such as LIDAR system 115 and imaging system 120, to obtain sensor readings. The sensor readings of LIDAR system 115 include 3D point cloud data, also referred to as 3D point data of a points cloud, from which physical properties of components related to the construction project can be derived. A portion of the 3D point cloud data includes data from which physical properties of components related to building 105, such as 3D locations of various surface points of various components of or associated with building 105, can be derived.

Figure 2:
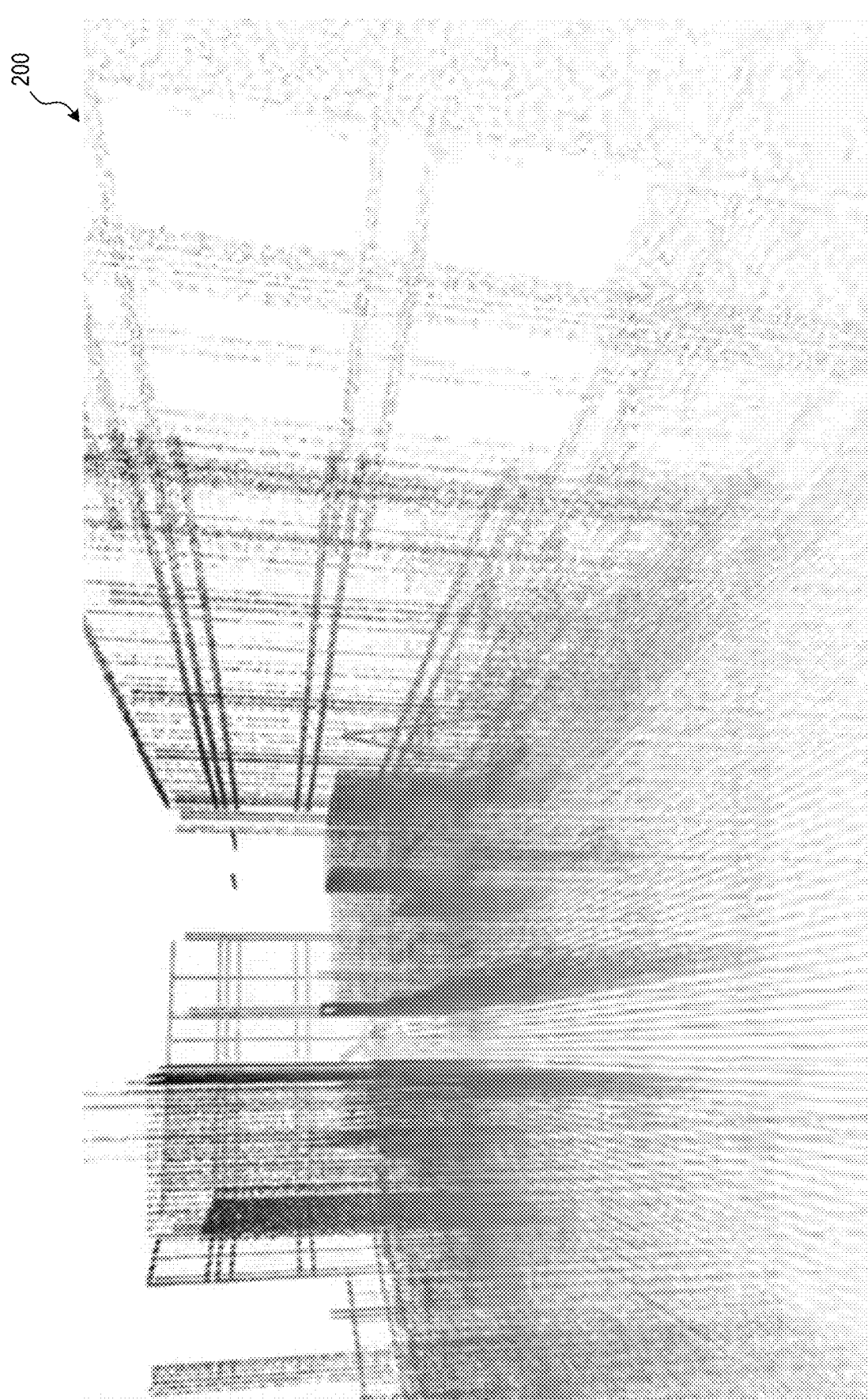
FIG. 2 is an example of a visualization of three-dimensional (3D) point cloud data obtained by a LIDAR system.

FIG. 2 is an example of a visualization 200 of 3D point cloud data obtained by a LIDAR system of a 3D structure undergoing construction.

The sensor readings of imaging system 120 includes imaging data, such as still picture or video data, from which physical properties of components related to the construction project can be derived. A portion of the imaging data includes data from which physical properties of components related to building 105 can be derived, such as the color or texture of surfaces of components, among others. Examples of components of building 105 include a pipe, beam, wall, floor, ceiling, toilet, roof, door, door frame, metal stud, wood stud, light fixture, piece of sheetrock, water heater, air conditioner unit, water fountain, cabinet, table, desk, refrigerator, sink, among others. Examples of components of landscaping include a tree, shrub, bench, mound, walkway, light fixture, sprinkler head, drainage fixtures, among others. Examples of physical properties of components include 3D locations of points on the surface of the component, the surface texture of the component, the 3D location of the component, the color of the component, the density or weight of the component, the reflectivity of the component, material type, unique identification of a component, unique identification of a material of a component, a flow rate, a gauge or thickness of a material of the component, among others.

In this example, robot 110 wirelessly transmits data derived from the sensor readings, which can be or include the raw sensor readings, to cloud storage 130 via network 125 for storage, where computer system 135 is able to access the stored data. Network 125 can be or can include the Internet. In some embodiments, robot 110 stores the data derived from the sensor data at storage local to robot 110, where computer system 135 is able to access the data. In some embodiments, computer system 135 is local to robot 110.

Computer system 135 accesses the data stored at cloud storage 130 or at local storage. Computer system 135 creates a 3D design view based on the design plan data and identifies the various components of the 3D design view. Computer system 135 creates a 3D progress view based on the sensor data and identifies the various components of the 3D progress view. Computer system 135 maps components of the 3D progress view to corresponding components of the 3D design view and analyzes the data to detect physical discrepancies between the two views. In some embodiments, when there is a deviation exists relative to a predetermined threshold, the discrepancy is reported as an error.

Physical discrepancies or deviations from an expected physical structure can include, for example, a 3D progress view component being located at a different location as compared to its corresponding 3D design view component, being of an different dimension as compared to its corresponding 3D design view component, being of a different color as compared to its corresponding 3D design view component, being comprised of a different material as compared to its corresponding 3D design view component, having a different surface texture as compared to its corresponding 3D design view component, being a different component as compared to its corresponding 3D design view component (e.g., being a 45-degree angle joint as compared to a 90-degree angle joint, being an a brand 1 air conditioning unit as compared to a brand 2 air conditioning unit, or being an iron pipe as compared to a copper pipe).

In some embodiments, the difference may need to be greater than a predetermined threshold to be deemed as a reportable discrepancy (e.g., a location error in excess of ⅛ of an inch). In some cases, the threshold, also sometimes referred to as accuracy tolerance, is input by the design team or by other methods as annotations on the components of the design plans. For example, a pipe may have an accuracy tolerance of ⅛ of an inch, and that tolerance may be added as an annotation on the pipe via a CAD application used to create design plan data. When the discrepancy between the location of the component in the 3D design view and the 3D progress view is greater that the accuracy tolerance, the discrepancy can be reported as an error.

Computer system 135 can detect other types of deviations. In some embodiments, the data stored at cloud storage 130 includes schedule data or other performance metrics. Computer system 135, based on the above mapping and analysis, is able to determine which components have been properly installed, which have not been installed at all or have been only partially installed, or which have been installed incorrectly. Based on this analysis, computer system 135 can detect various other types of discrepancies. For example, computer system 135 can detect a discrepancy between progress projected by a schedule or expected progress and actual progress (e.g., progress as determined based on an analysis of components of the 3D progress view, giving credit for those components that have been properly installed, and not giving credit for components that have discrepancies that need to be addressed).

As another example, computer system 135 can detect a discrepancy between a planned or targeted productivity level and an actual productivity level. In some embodiments, alerts can be being displayed for different types of discrepancies. For example, an application running on a mobile device can enable a user to set alert notification parameters, including setting an alert for a planned or targeted productivity level/score, or setting an alert for a planned progress. Based on the above analysis, mapping, and discrepancy detection, computer system 135 can provide construction progress status. For example, a mobile application or web interface can provide a milestone progress status for several groups of tasks of a building construction project.

Figure 3A:
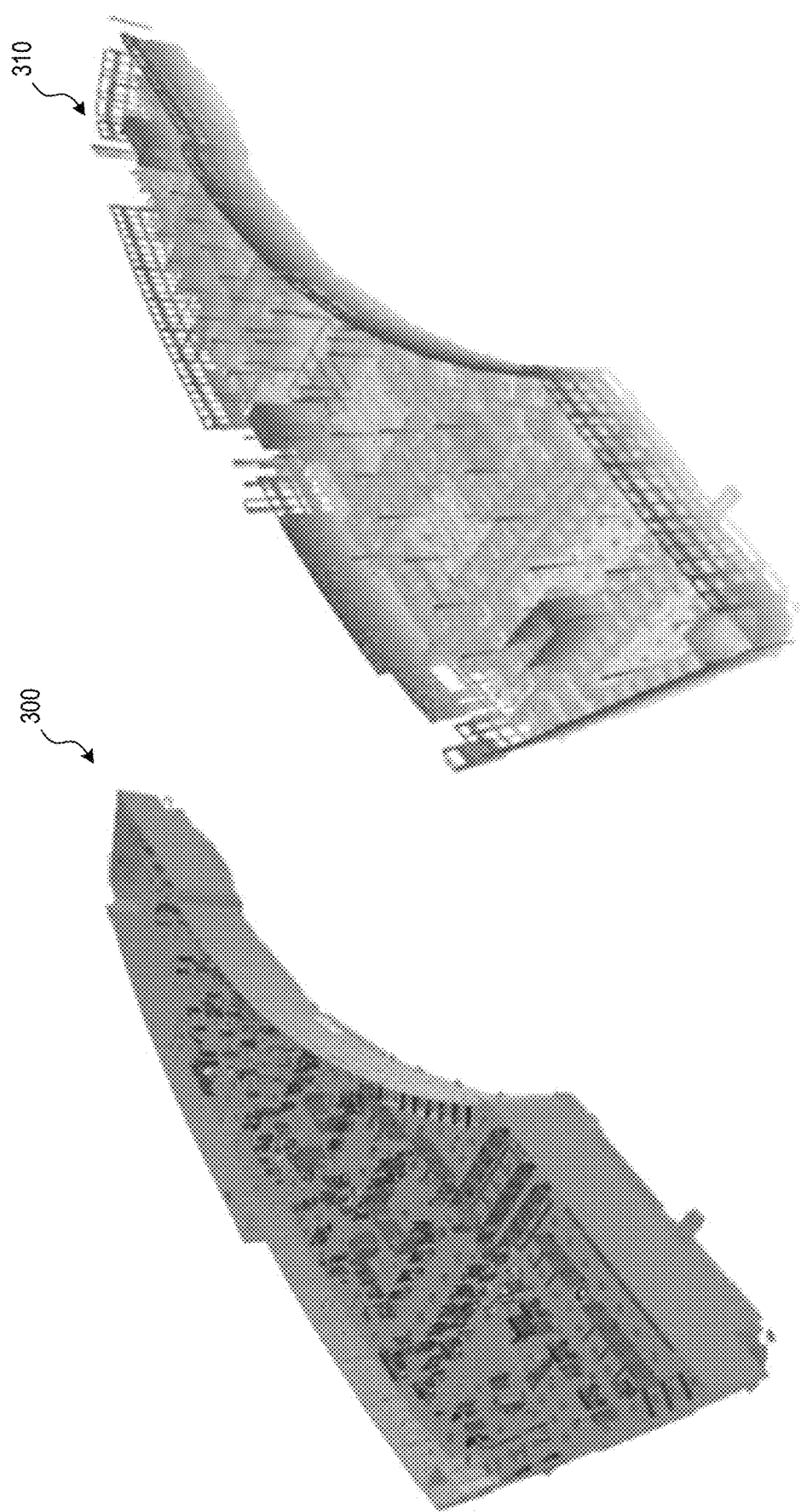
FIG. 3A depicts an image of a 3D structure undergoing construction and a computer model of the 3D structure.
Figure 3B:
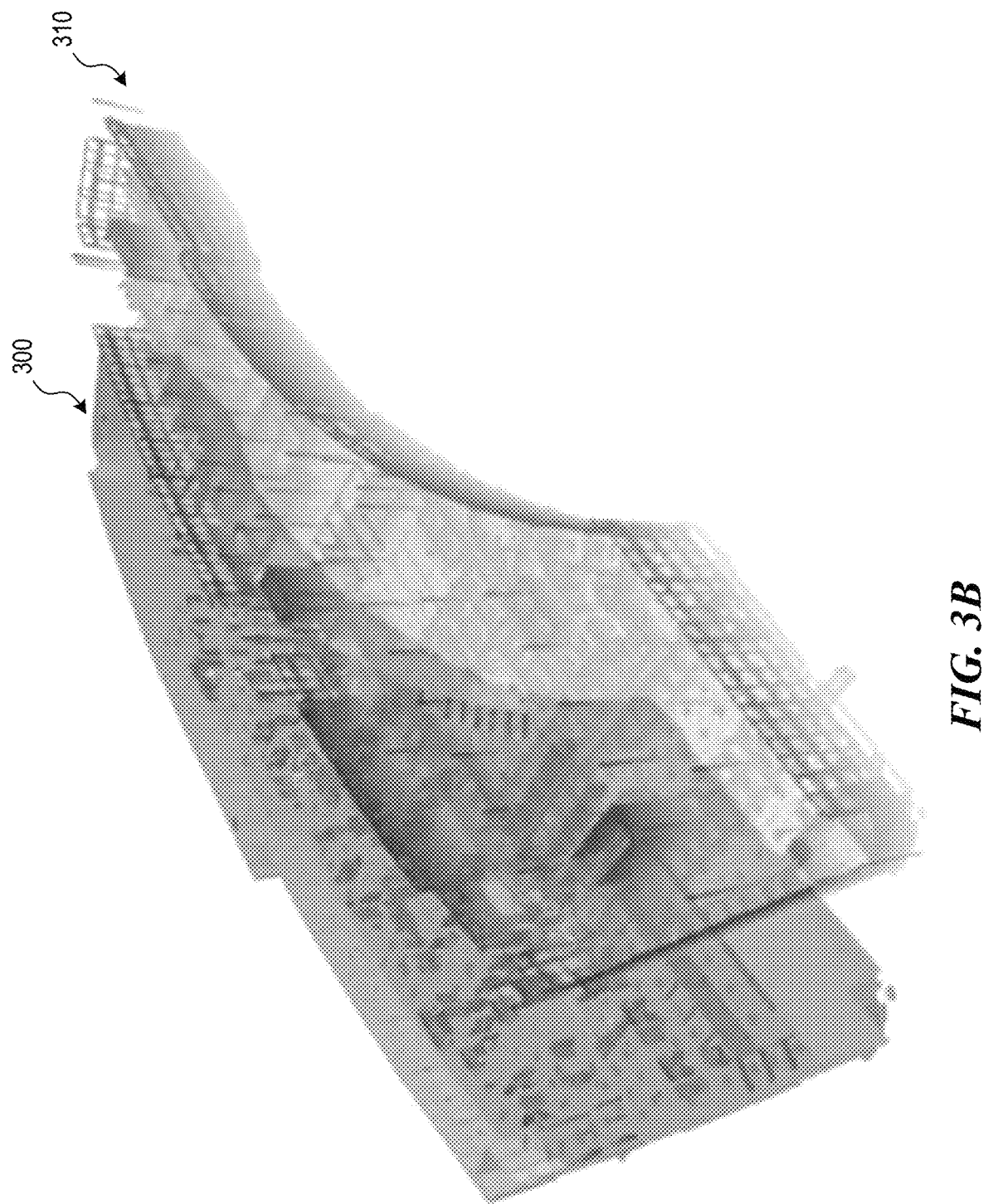
FIG. 3B depicts an alignment of a 3D structure undergoing construction with a computer model of the 3D structure.
Figure 3C:
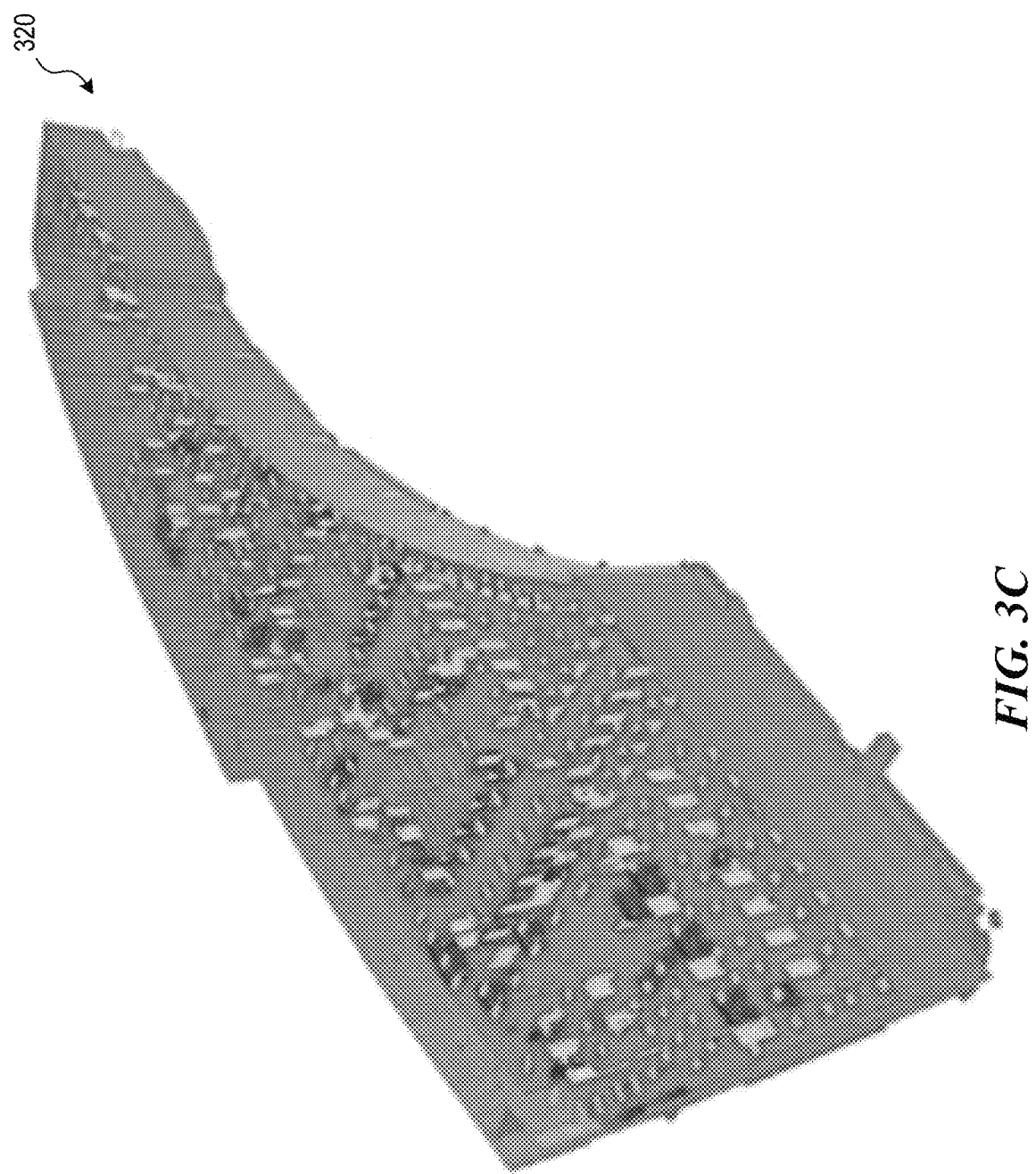
FIG. 3C depicts an image of a 3D structure undergoing construction aligned with a computer model of the 3D structure.

FIGS. 3A through 3C are illustrations that depict alignment of data derived from a model of a building, such as the reference structure, and sensor data derived from a sensor reading of a building, such as a building under construction. Specifically, FIG. 3A depicts two views, a view 300 of a reference structure and a view 310 of a structure under construction. FIG. 3B depicts the two views 300 and 310 as they conceptually begin to align, and FIG. 3C shows a combined view 320 after alignment of the two views 300 and 310. FIGS. 3A through 3C are conceptualizations of the alignment process and may not reflect how a computer system actually aligns the views. For example, the computer system may not incrementally move the two views closer together.

FIGS. 3A through 3C reflect a common practice in the construction industry to compare the scan image of a 3D structure undergoing construction to a computer model (e.g., CAD model) that depicts the expected 3D structure. This is performed periodically with respective instances of scan images of the 3D structure that can be compared to instances of a computer model that track the progression of the ongoing construction of the 3D structure.

This allows an analyst to check that the ongoing construction of the 3D structure is closely following the instances of the computer model of the 3D structure undergoing construction, where every element of the 3D structure is represented as a geometrical shape with known 3D coordinates. As previously described, the construction industry is widely adopting a technique that involves using laser scanners and other means to scan a 3D structure that is undergoing construction. A result of the 3D scan is a data set representing points in 3D space referred to as a 3D point cloud data that forms a "points cloud."

To compare the progress of the ongoing actual construction to an expected construction of a structure, an analyst is tasked with aligning 3D point cloud data of the structure with a computer model that depicts the expected 3D structure undergoing construction. Specifically, a coordinate frame of a scan image of a 3D structure undergoing construction must be aligned with a coordinate frame of a computer model that depicts the expected 3D structure at the point in time when the 3D structure is undergoing construction.

An alignment procedure typically involves positioning crosshair reference marks at different locations of an ongoing construction of a structure. Accordingly, a scan image of the 3D structure includes embedded images of the crosshair reference marks. An analyst must them manually locate the crosshair marks in the 3D point cloud data derived from the scan image. The analyst selects each crosshair individually and establishes a correspondence with a crosshair mark in the computer model of the expected 3D structure. In other words, the analyst must manually map the crosshair marks obtained from the scan image of the ongoing construction to corresponding crosshair marks in the computer model. Therefore, the alignment process is laborious, time-consuming, and a costly process that results in delays (e.g., days, weeks) before data about a scan image is even ready to compare against an expected representation in the computer model.

To track the progress of an ongoing construction until it is brought to completion, the process of aligning a 3D point cloud data and an instance of a computer model must be repeated periodically. For example, a scan image can be obtained periodically and compared to a corresponding computer model of the same coordinate frame at an expected point in time of the ongoing construction.

Accordingly, the process of mapping 3D point cloud data to an instance of a computer model is periodic at successive points in time. Consequently, the benefits of ensuring that an ongoing construction of a 3D structure does not deviate from its expected 3D model is vastly outweighed by construction delays and costs that result from periodically repeating the laborious, time-consuming, and costly alignment process before even analyzing the differences between the actual and expected representations. That is, any savings that result from avoiding the need to re-work a construction is negated by the costs that result from delays in construction to prepare and perform the deviation analysis. Consequently, the manual mapping process is cost-prohibitive and unsuitable for repetitive low-latency data capture for deviation analysis.

Figure 4:
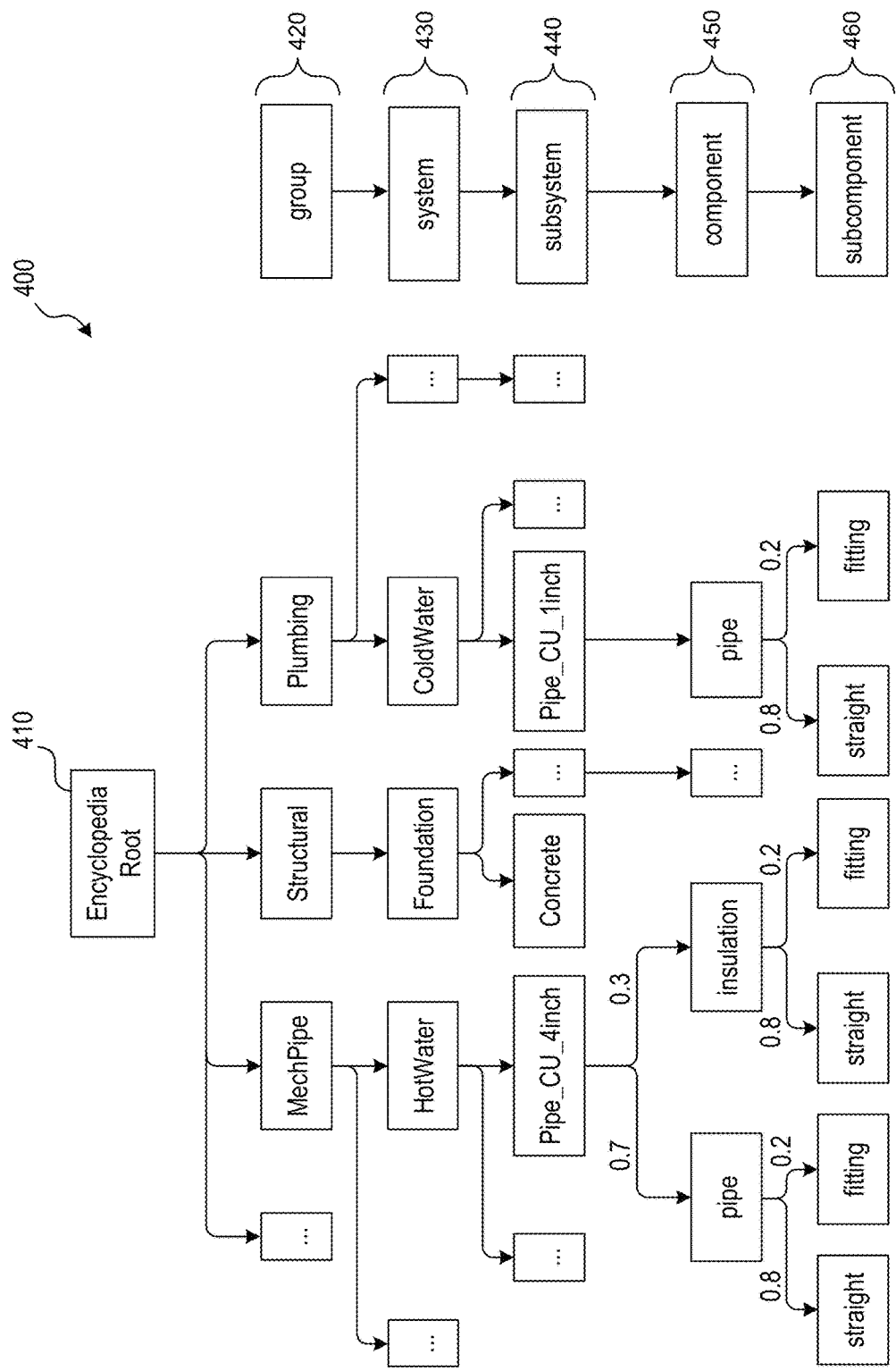
FIG. 4 depicts a representation of a data structure that stores construction data comprising multiple elements of construction projects arranged in a hierarchical configuration.

FIG. 4 depicts a representation of a data structure 400 that stores construction data comprising multiple elements of construction projects and associated construction activities arranged in a hierarchical configuration. The data structure 400 can comprise, for example, a database. The data structure 400 stores data for multiple elements of construction projects that are arranged in the hierarchical configuration to define relationships between the multiple elements. Additionally, the data structure 400 stores data for construction activities included in construction projects, and these construction activities can be arranged in the hierarchical configuration and/or associated with elements. Each element and/or construction activity can be associated with a group, system, subsystem, component and/or subcomponent that is included in construction projects, and each element and/or construction activity can be associated with data and/or metadata, such as costs and/or scheduling data (e.g., cost and/or time to install a plumbing system, cost of a team of carpenters per hour or day, correct orientation of a pipe or fitting, phases of construction for subsystems). The data structure 400 can be used, for example, to generate models or mappings whereby relationships between elements and construction activities for a particular structure are standardized. The standardized relationships between the elements and construction activities can be used to evaluate structures undergoing construction, such as to generate a status of construction and/or an estimate of completion.

The hierarchical configuration of the data structure 400 has a tree structure that comprises multiple levels 420-460, each associated with a common root 410. The root 410 can encompass or represent all relevant work in the construction process, such as construction activities associated with elements of structures, which are further defined and/or related to one another via the multiple levels 420-460 of the data structure 400.

A first level 420 comprises multiple elements and/or construction activities associated with different groups (e.g., trades or teams) associated with construction projects. The groups can include plumbing, structural, mechanical pipe, and so forth, which are each responsible for construction of systems included in a structure.

A second level 430 comprises multiple elements and/or construction activities associated with systems that are included in construction projects, such as cold water systems, hot water systems, foundations, heating or cooling systems, and so forth. The systems are associated with specific groups that are responsible for building the systems, such as a cold water system at the second level 430 that is associated with a plumbing group at the first level 420.

A third level 440 comprises multiple elements and/or construction activities associated with subsystems of the systems included in the second level 430. For example, a concrete subsystem at the third level 440 can be associated with a foundation system at the second level 430.

A fourth level 450 comprises multiple elements and/or construction activities associated with components of the subsystems included in the third level 440. For example, a pipe subsystem included in the third level 440 can include, at the fourth level 450, a pipe and insulation for the pipe.

A fifth level 460 comprises multiple elements and/or construction activities associated with subcomponents of the components included in the fourth level 450. For example, a pipe component at the fourth level 450 can include subcomponents of a straight section of pipe and a fitting.

The data structure 400 can include any number of levels, elements, and/or construction activities, and the data structure can be modified over time, such as to define newly identified elements or construction activities. Although a single data structure 400 is depicted, multiple data structures 400 can be used, such as different data structures 400 for different kinds of construction projects (e.g., residential construction, commercial construction, industrial construction, naval architecture). In some implementations, the data structure 400 can be used in conjunction with one or more other data structures having a similar hierarchical configuration, which can be used to generate additional mappings and/or compound mappings. The one or more other data structures can relate to other objects (e.g., physical objects) and/or activities that can be modeled, similar to the elements and construction activities represented in the data structure 400, and used to generate mappings. For example, one or more other data structures can be used to model transportation infrastructure and activities, weather or climate events, landscaping, maintenance activities, permitting and/or regulatory activities, and so forth.

As shown in FIG. 4, the elements and/or construction activities of the data structure 400 are associated with one another via branches, each branch comprising subbranches between individual elements and/or construction activities. The branches and/or subbranches define paths between elements, construction activities, and/or levels, which can be used to search for particular elements and/or construction activities and/or to define relationships between elements and/or construction activities. In some implementations, the paths are unidirectional. In some implementations, the subbranches or the unidirectional paths are weighted for various purposes. For example, weights can be assigned based on a degree to which an element or construction activity affects the progress of construction. In some implementations, weights can indicate relative cost associated with an element or construction activity, rules-of-credit for an element or construction activity, construction or installation times associated with elements or construction activities, and so forth. Thus, an element at a particular level of the data structure 400 can be associated with a value, which can be multiplied by an associated weight, and the product can be added to a value of a higher-level node of the data structure 400 to evaluate a construction project.

Figure 5:
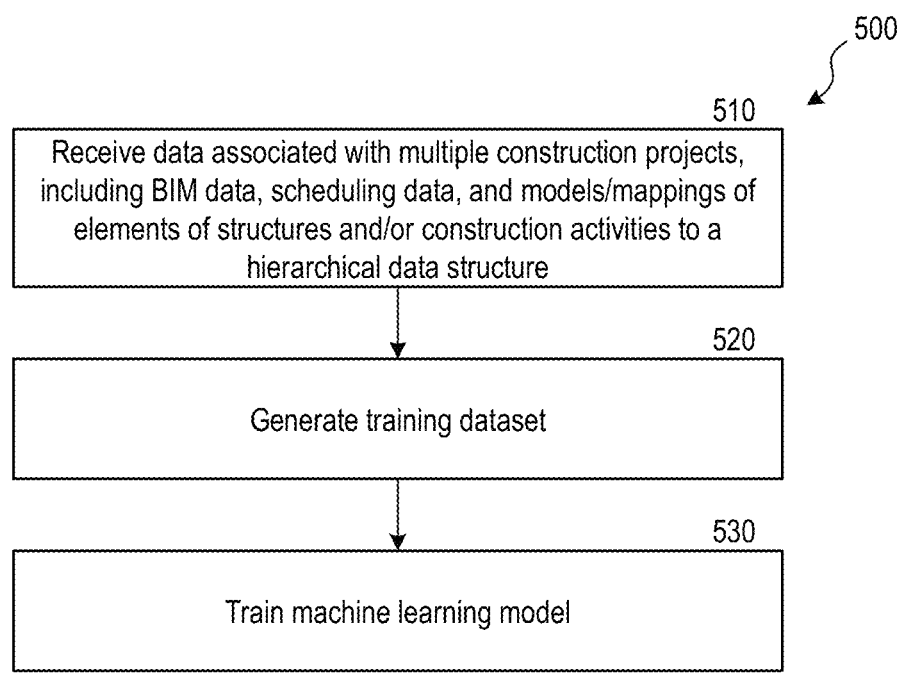
FIG. 5 is a flow diagram that illustrates a process to train a machine learning model to generate mappings of elements of structures in a standardized format.

FIG. 5 is a flow diagram that illustrates a process 500 to train a machine learning model to generate mappings of elements of structures and/or associated construction activities in a standardized format. For example, a machine learning model trained using the process 500 can be used to generate a mapping or a model that standardizes relationships between elements of a particular structure undergoing construction and/or construction activities for the particular structure to multiple elements and/or construction activities included in a hierarchical configuration of elements (e.g., the data structure 400 of FIG. 4). The mapping or model can then be used to perform various operations associated with the particular structure, such as evaluating construction of the particular structure and/or generating a status of construction for the particular structure.

The process 500 begins at block 510, where data is received for multiple construction projects. For each construction project, the data can include BIM data, which can be in various formats that are not standardized across construction projects. The BIM data comprises digital drawings (e.g., CAD files) of a structure comprising multiple elements. The data also includes schedule data for each construction project, which can comprise construction activities and indications of expected progress of the construction activities at different points in time. In some implementations, the data includes other data, such as budget data for the construction project. Additionally, the received data includes a mapping of the elements of the structures to multiple elements in a hierarchical configuration, such as a mapping to the data structure 400 of FIG. 4. The mapping further maps the schedule data and/or any other data (e.g., budget data) to corresponding data in the hierarchical configuration. The mappings facilitate representations of the construction projects in a standardized format.

At block 520, a training dataset is created using the data received at block 510. For example, BIM data, scheduling data, and/or mappings for particular projects can be associated with one another, and one or more attributes of the BIM data and/or the schedule data can be analyzed to determine attributes that correspond to the mappings. These one or more attributes can include, for example, dimensions of particular elements in the BIM data that correspond to dimensions of related elements specified in the mappings to the hierarchical configuration and/or progress of one or more construction activities in the schedule data that correspond to data in the mappings. Additionally or alternatively, the one or more attributes can include metadata associated with particular elements in the BIM data that correspond to metadata of related elements specified in the mappings and/or metadata associated with scheduling data.

At block 530, the training dataset is used to train a machine learning model to generate mappings or models that standardizes how particular elements of a particular structure and/or construction activities relate to the multiple elements and/or construction activities in the hierarchical configuration.

A "model," as used herein, can refer to a construct that is trained using training data to make predictions or provide probabilities for new data items, whether or not the new data items were included in the training data. For example, training data for supervised learning can include items with various parameters and an assigned classification. A new data item can have parameters that a model can use to assign a classification to the new data item. As another example, a model can be a probability distribution resulting from the analysis of training data, such as a likelihood of an n-gram occurring in a given language based on an analysis of a large corpus from that language. Examples of models include: neural networks, support vector machines, decision trees, Parzen windows, Bayes, clustering, reinforcement learning, probability distributions, decision trees, decision tree forests, and others. Models can be configured for various situations, data types, sources, and output formats.

In some implementations, the machine learning model can be a neural network with multiple input nodes that receive data associated with construction projects. The input nodes can correspond to functions that receive the input and produce results. These results can be provided to one or more levels of intermediate nodes that each produce further results based on a combination of lower level node results. A weighting factor can be applied to the output of each node before the result is passed to the next layer node. At a final layer, ("the output layer") one or more nodes can produce a value classifying the input that, once the model is trained, can be used to generate mappings of elements and/or construction activities for particular structures to a hierarchical configuration. In some implementations, such neural networks, known as deep neural networks, can have multiple layers of intermediate nodes with different configurations, can be a combination of models that receive different parts of the input and/or input from other parts of the deep neural network, or are convolutions—partially using output from previous iterations of applying the model as further input to produce results for the current input.

A machine learning model can be trained with supervised learning. A representation of a construction project can be provided to the model, such as BIM data and schedule data for the construction project. Output from the model can be compared to the desired output for that construction project and, based on the comparison, the model can be modified, such as by changing weights between nodes of the neural network or parameters of the functions used at each node in the neural network (e.g., applying a loss function). After applying each of the sets of construction project data in the training data and modifying the model in this manner, the model can be trained to evaluate new construction projects (e.g., represented by BIM data and schedule data).

In some implementations, the process 500 can include evaluating and/or retraining the trained machine learning model. For example, a portion of training data can be held back as testing data to be used to evaluate accuracy of the trained machine learning model. When the trained machine learning model does not exceed a threshold accuracy, the machine learning model can be retrained. Retraining the machine learning model can include training the machine learning model at least a second time using the same training dataset, training the machine learning model with a different (e.g., expanded) training dataset, applying different weightings to a training dataset, rebalancing a training dataset, and so forth.

Through retraining, the model can be made more accurate, such as to correct for variances between expected outcomes and actual outcomes and/or to correct for model drift. Various techniques can be used to train and/or retrain the machine learning model. For example, adaptive boosting can be used, which is an iterative process that runs multiple tests on a collection of training data. Adaptive boosting transforms a weak learning algorithm (e.g., an algorithm that performs at a level only slightly better than chance) into a strong learning algorithm (an algorithm that displays a low error rate, e.g., below a threshold error rate). The weak learning algorithm is run on different subsets of the training data. The algorithm concentrates more and more on those examples in which its predecessors tended to show mistakes. The algorithm corrects the errors made by earlier weak learners. The algorithm is adaptive because it adjusts to the error rates of its predecessors. Adaptive boosting combines rough and moderately inaccurate rules of thumb to create a high-performance algorithm. Adaptive boosting combines the results of each separately run test into a single, very accurate classifier. Adaptive boosting can use, for example, weak classifiers that are single-split trees with only two leaf nodes.

Figure 6:
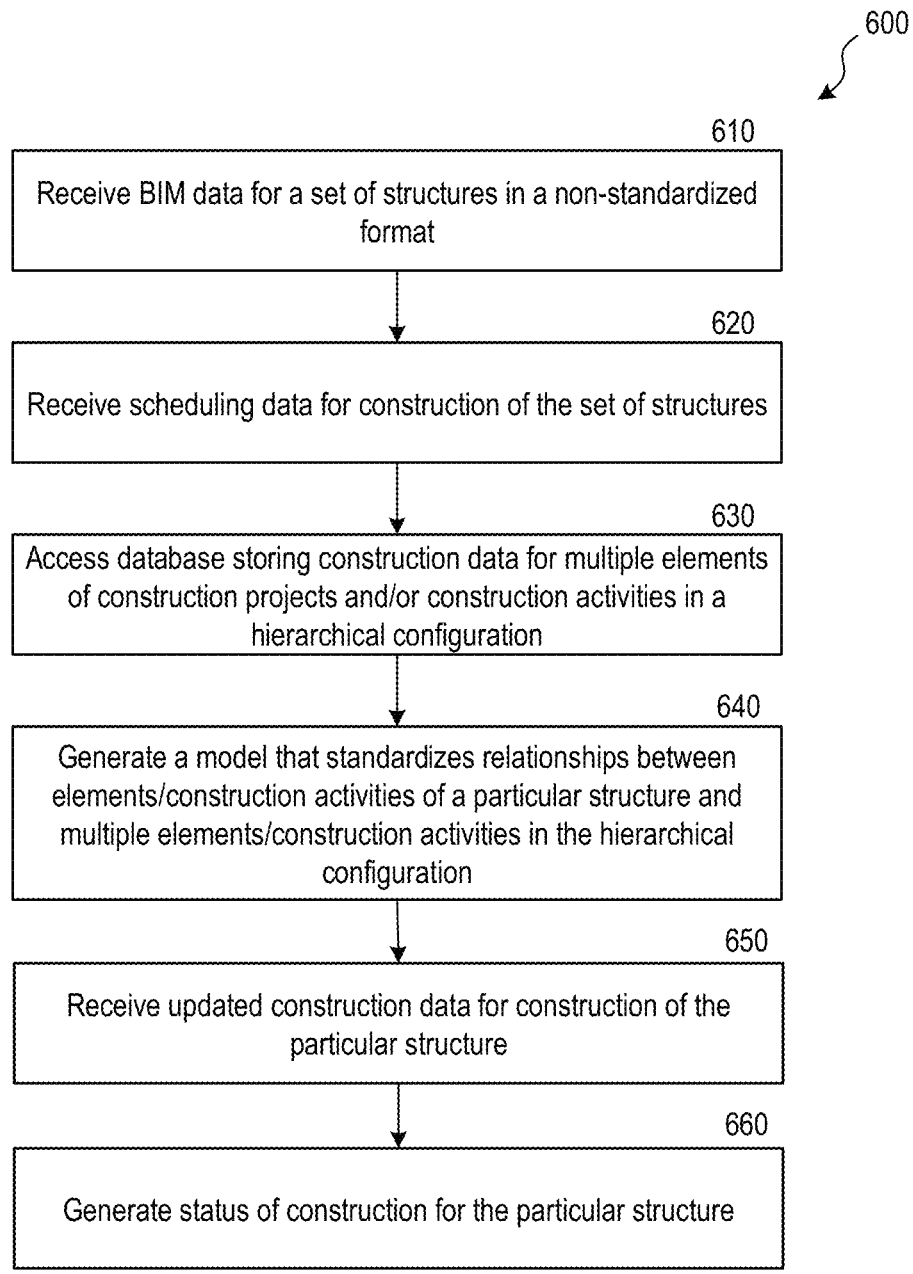
FIG. 6 is a flow diagram that illustrates a process to generate a status of construction of a structure undergoing construction.

FIG. 6 is a flow diagram that illustrates a process 600 to generate a status of construction of a structure undergoing construction.

The process 600 begins at 610, where BIM data is received for a set of structures. In one example, the BIM data is in a non-standardized format. In other words, the format of the BIM data can vary across structures. As described herein, the BIM data comprises digital drawings of a structure, comprising digital representations of the elements of the structure. The elements can be associated with various metadata.

At 620, scheduling data is received for construction of the set of structures. For each structure, the scheduling data can include indications of expected progress of construction activities at different points in time. For example, the scheduling data can indicate installation of components and/or subcomponents at different points in time, activities of groups or teams at different points in time, activities and/or progress associated with systems or subsystems at different points in time, and so forth.

At 630, a database is accessed, which stores construction data for multiple elements of construction projects and/or associated construction activities in a hierarchical configuration. The hierarchical configuration can be, for example, as illustrated in the data structure 400 of FIG. 4. The hierarchical configuration has a tree structure that defines branches that each have one or more types of elements and/or construction activities including a group and a system, a subsystem, a component, and/or a subcomponent at respective levels. The hierarchical configuration defines paths between the levels of the branch. In some implementations, the branches can have subbranches between levels. In some implementations, one or more paths can be associated with a weight, which indicates a relative contribution of an element and/or construction activity to a construction process (e.g., related to time for construction, cost of construction, or rules-of-credit).

At 640, a model is generated that standardizes relationships between elements of a particular structure and/or construction activities for the particular structure and multiple elements and/or construction activities in the hierarchical configuration. The model can comprise and/or be generated using a machine learning model, such as a machine learning model trained using the process 500 of FIG. 5.

At 650, updated construction data is received regarding an ongoing construction of the particular structure associated with the model generated at block 640. The updated construction data can indicate current states of the particular elements of the particular structure and/or construction activities for the particular structure, such as indications of elements that have been installed and/or constructed, and/or indications of elements that have not been installed and/or constructed. The updated construction data can include sensor data based on sensor scans of the particular structure, such as LIDAR data, image data (e.g., still images and/or video), hyperspectral images, thermal imaging data, synthetic aperture radar images, data from tagged items (e.g., using radio frequency identification (RFID)), and/or data received from connected devices that capture activities occurring at a construction site (e.g., tools or elements with Bluetooth or WiFi connectivity). The updated construction data can be received, at least in part, via a construction monitoring system, such as a construction monitoring system that uses a robot 110 of FIG. 1 or another device or system to collect construction data related to a structure undergoing construction.

At 660, a status of construction of the particular structure is generated. The status of construction can comprise an evaluation of the construction of the structure and/or an estimate of completion of the structure. In some implementations, the status of construction includes an estimate of remaining time to completion of the structure or an estimate of future costs associated with the construction of the structure. In some implementations, generating the status of construction can include predicting a delay and/or calculating probability of delay in completion of the construction of the structure relative to an expected completion and/or estimating a delay in progress of the construction of the structure at a point in time relative to an expected progress of the construction. In some implementations, generating the status of the construction of the structure can include predicting a cost to complete the construction of the particular structure relative to an expected cost to complete the construction of the structure and/or estimating a cost of the construction of the structure at a point in time relative to an expected cost of the construction of the structure at the same point in time.

In some implementations, the generated status of construction can be for only a portion of a structure, such as a system or subsystem of the structure. In some implementations, generating the status of construction can include determining responsibility for a delay (e.g., identifying a group or team responsible for the delay), assessing or estimating damages resulting from a delay, estimating impacts from a change order, and/or generating recommended actions (e.g., to mitigate or avoid a delay).

In some implementations, the status of construction can be generated for a particular level in the hierarchical configuration (e.g., levels of the data structure 400 of FIG. 4), such as a status of construction for particular groups, systems, or subsystems. In these and other implementations, the status of construction can include an evaluation, for example, of performance of groups or teams (e.g., plumbing, carpentry, electrical, and so forth) relative to a planned schedule and/or evaluation of other performance metrics for a group or team. For example, the process 600 can include using the generated model to determine or estimate a delay in progress of the construction of the particular structure at one or more points in time, as compared to expected progress of construction at the one or more points in time (e.g., based on the scheduling data). The process 600 can further include identifying a level or group within the hierarchical configuration that is associated with the delay, such as one or more teams that are responsible for the delay and/or one or more systems or subsystems causing the delay. Additionally, the process 600 can evaluate performance of the level or group based at least in part on the delay. The evaluation can include generating one or more performance metrics (e.g., numerical scores) indicating performance of the level or group, such as an overall performance of a team or system.

It will be appreciated that the operations can be added to and/or omitted from the processes 500 and 600 while maintaining a similar functionality. Additionally, operations of the processes 500 and 600 can be performed in any order, including performing one or more operations in parallel and/or repeating one or more operations.

Figure 7:
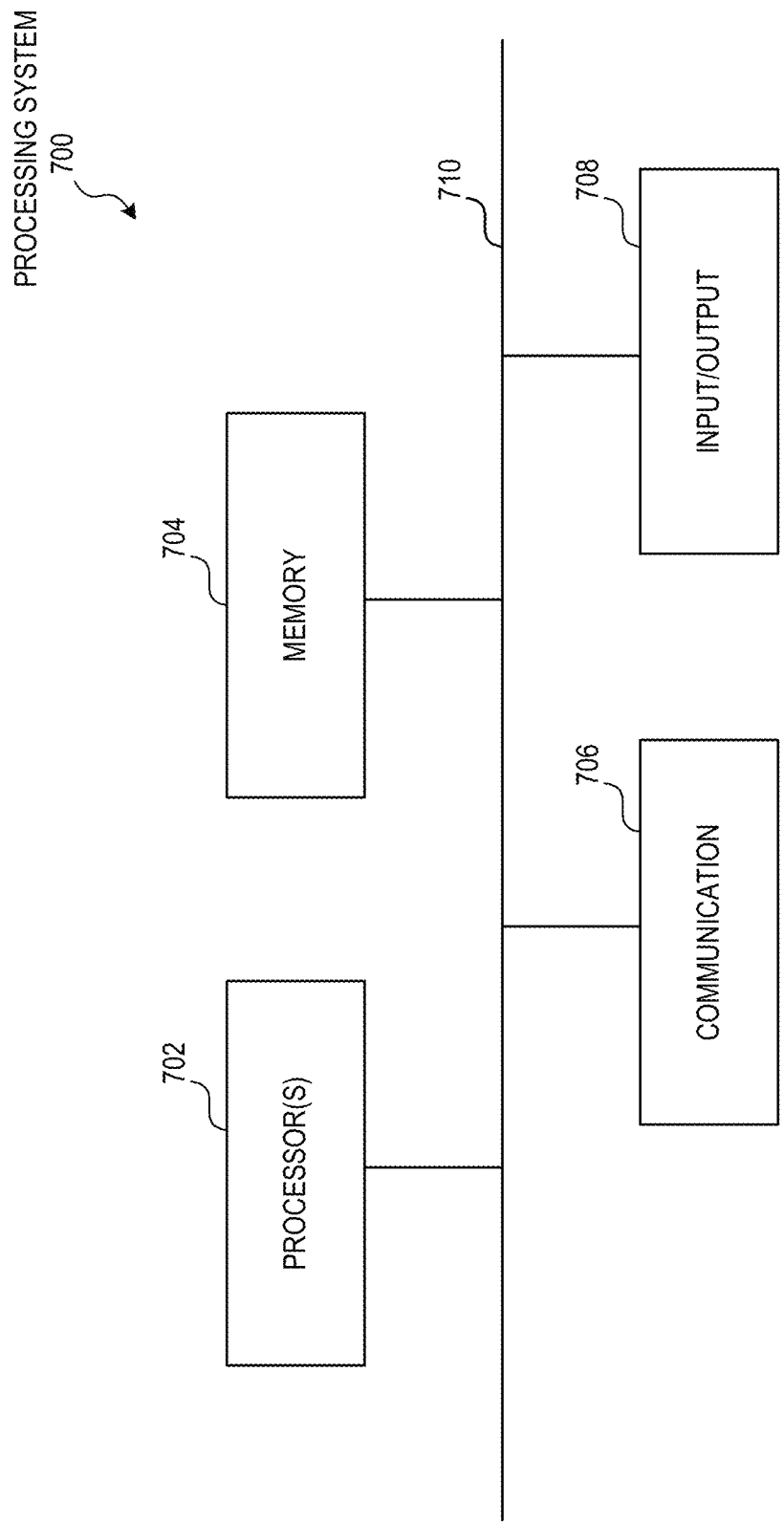
FIG. 7 is a block diagram that illustrates an example of a processing system in which at least some operations described herein can be implemented.

FIG. 7 is a block diagram illustrating an example of a processing system 700 in which at least some operations described herein can be implemented, which can run any of the methods/algorithms described above. For example, processing system 700 can be computer system 135, or can be a processing device included in robot 110, LIDAR 115, or imaging system 120, among others. A system may include two or more processing devices such as represented in FIG. 7, which may be coupled to each other via a network or multiple networks. A network can be referred to as a communication network.

In the illustrated embodiment, the processing system 700 includes one or more processors 702, memory 704, a communication device 706, and one or more input/output (I/O) devices 708, all coupled to each other through an interconnect 710. The interconnect 710 may be or include one or more conductive traces, buses, point-to-point connections, controllers, adapters and/or other conventional connection devices. Each of the processors 702 may be or include, for example, one or more general-purpose programmable microprocessors or microprocessor cores, microcontrollers, application specific integrated circuits (ASICs), programmable gate arrays, or the like, or a combination of such devices. The processor(s) 702 control the overall operation of the processing system 700. Memory 704 may be or include one or more physical storage devices, which may be in the form of random-access memory (RAM), read-only memory (ROM) (which may be erasable and programmable), flash memory, miniature hard disk drive, or other suitable type of storage device, or a combination of such devices. Memory 704 may store data and instructions that configure the processor(s) 702 to execute operations in accordance with the techniques described above. The communication device 706 may be or include, for example, an Ethernet adapter, cable modem, Wi-Fi adapter, cellular transceiver, Bluetooth transceiver, or the like, or a combination thereof. Depending on the specific nature and purpose of the processing system 700, the I/O devices 708 can include devices such as a display (which may be a touch screen display), audio speaker, keyboard, mouse or other pointing device, microphone, camera, etc.

While processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations, or may be replicated (e.g., performed multiple times). Each of these processes or blocks may be implemented in a variety of different ways. In addition, while processes or blocks are at times shown as being performed in series, these processes or blocks may instead be performed in parallel, or may be performed at different times. When a process or step is "based on" a value or a computation, the process or step should be interpreted as based at least on that value or that computation.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM), random access memory (RAM), magnetic disk storage media, optical storage media, flash memory devices), etc.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described but can be practiced with modification and alteration within the spirit and scope of the disclosed embodiments. Accordingly, the specification and drawings are to be regarded in an illustrative sense rather than a restrictive sense.

Physical and functional components (e.g., devices, engines, modules, and data repositories) associated with processing system 700 can be implemented as circuitry, firmware, software, other executable instructions, or any combination thereof. For example, the functional components can be implemented in the form of special-purpose circuitry, in the form of one or more appropriately programmed processors, a single board chip, a field programmable gate array, a general-purpose computing device configured by executable instructions, a virtual machine configured by executable instructions, a cloud computing environment configured by executable instructions, or any combination thereof. For example, the functional components described can be implemented as instructions on a tangible storage memory capable of being executed by a processor or other integrated circuit chip. The tangible storage memory can be computer readable data storage. The tangible storage memory may be volatile or non-volatile memory. In some embodiments, the volatile memory may be considered "non-transitory" in the sense that it is not a transitory signal. Memory space and storages described in the figures can be implemented with the tangible storage memory as well, including volatile or non-volatile memory.

Each of the functional components may operate individually and independently of other functional components. Some or all of the functional components may be executed on the same host device or on separate devices. The separate devices can be coupled through one or more communication channels (e.g., wireless or wired channel) to coordinate their operations. Some or all of the functional components may be combined as one component. A single functional component may be divided into sub-components, each subcomponent performing separate method step or method steps of the single component.

In some embodiments, at least some of the functional components share access to a memory space. For example, one functional component may access data accessed by or transformed by another functional component. The functional components may be considered "coupled" to one another if they share a physical connection or a virtual connection, directly or indirectly, allowing data accessed or modified by one functional component to be accessed in another functional component. In some embodiments, at least some of the functional components can be upgraded or modified remotely (e.g., by reconfiguring executable instructions that implements a portion of the functional components). Other arrays, systems and devices described above may include additional, fewer, or different functional components for various applications.

Aspects of the disclosed embodiments may be described in terms of algorithms and symbolic representations of operations on data bits stored in memory. These algorithmic descriptions and symbolic representations generally include a sequence of operations leading to a desired result. The operations require physical manipulations of physical quantities. Usually, though not necessarily, these quantities take the form of electric or magnetic signals that are capable of being stored, transferred, combined, compared, and otherwise manipulated. Customarily, and for convenience, these signals are referred to as bits, values, elements, symbols, characters, terms, numbers, or the like. These and similar terms are associated with physical quantities and are merely convenient labels applied to these quantities.

While embodiments have been described in the context of fully functioning computers, those skilled in the art will appreciate that the various embodiments are capable of being distributed as a program product in a variety of forms and that the disclosure applies equally, regardless of the particular type of machine or computer-readable media used to actually effect the embodiments.

The disclosed technology can be embodied using special-purpose hardware (e.g., circuitry), programmable circuitry appropriately programmed with software and/or firmware, or a combination of special-purpose hardware and programmable circuitry. Accordingly, embodiments may include a machine-readable medium having instructions that may be used to program a computing device to examine video content generated by an electronic device, identify elements included in the video content, apply a classification model to determine an appropriate action, and perform the appropriate action.

The purpose of terminology used herein is only for describing embodiments and is not intended to limit the scope of the disclosure. Where context permits, words using the singular or plural form may also include the plural or singular form, respectively.

As used herein, unless specifically stated otherwise, terms such as "processing," "computing," "calculating," "determining," "displaying," "generating," or the like, refer to actions and processes of a computer or similar electronic computing device that manipulates and transforms data represented as physical (electronic) quantities within the computer's memory or registers into other data similarly represented as physical quantities within the computer's memory, registers, or other such storage medium, transmission, or display devices.

As used herein, terms such as "connected," "coupled," or the like, may refer to any connection or coupling, either direct or indirect, between two or more elements. The coupling or connection between the elements can be physical, logical, or a combination thereof.

References to "an embodiment" or "one embodiment" means that the particular feature, function, structure, or characteristic being described is included in at least one embodiment. Occurrences of such phrases do not necessarily refer to the same embodiment, nor are they necessarily referring to alternative embodiments that are mutually exclusive of one another.

Unless the context clearly requires otherwise, the words "comprise" and "comprising" are to be construed in an inclusive sense rather than an exclusive or exhaustive sense (i.e., in the sense of "including but not limited to").

As used herein, the term "based on" is also to be construed in an inclusive sense rather than an exclusive or exhaustive sense. Thus, unless otherwise noted, the term "based on" is intended to mean "based at least in part on."

As used herein, the term "module" may refer to software components, hardware components, and/or firmware components. Modules are typically functional components that can generate useful data or other output(s) based on specified input(s). A module may be self-contained. A computer program may include one or more modules. Thus, a computer program may include multiple modules responsible for completing different tasks or a single module responsible for completing multiple tasks.

When used in reference to a list of multiple items, the word "or" is intended to cover all of the following interpretations: any of the items in the list, all of the items in the list, and any combination of items in the list.

The sequences of steps performed in any of the processes described herein are exemplary. However, unless contrary to physical possibility, the steps may be performed in various sequences and combinations. For example, steps could be added to, or removed from, the processes described herein. Similarly, steps could be replaced or reordered. Thus, descriptions of any processes are intended to be open-ended.

We claim:

1. A computer-implemented method of evaluating progress of a structure undergoing construction in near-real time, the method comprising:
    receiving building information modeling (BIM) data in a non-standardized format for a set of structures undergoing construction,
        wherein the BIM data for each structure includes digital drawings of elements of the structure;
    receiving scheduling data associated with construction of each structure in the set of structures,
        wherein the scheduling data for each structure includes an expected progress of construction activities at different points in time;
    accessing a database storing construction data that associates multiple elements of construction projects and associated construction activities in a hierarchical configuration,
        wherein the hierarchical configuration defines branches that each have one or more types of elements and construction activities including a group and a system, a subsystem, a component, or a subcomponent at respective levels, and
        wherein the hierarchical configuration defines unidirectional paths between the levels of the branches;
    generating, based on the BIM data and the scheduling data, a machine learning (ML) model that standardizes how particular elements of a particular structure and construction activities for the particular structure relate to the multiple elements and the associated construction activities in the hierarchical configuration,
        wherein the ML model is trained based on a training dataset including multiple mappings of elements of structures other than the particular structure or construction activities for the structures to the multiple elements or the associated construction activities in the hierarchical configuration;
    receiving updated construction data regarding an ongoing construction of the particular structure,
        wherein the updated construction data indicates current states of the particular elements and construction activities for the particular structure, and
        wherein the updated construction data regarding the ongoing construction of the particular structure is in the non-standardized format;
    using the ML model, trained based on the training dataset including multiple mappings of elements of structures other than the particular structure or construction activities for the structures to the multiple elements or the associated construction activities in the hierarchical configuration, generate a mapping between the updated construction data regarding the ongoing construction of the particular structure and the hierarchical configuration,
        wherein the construction data indicates whether the particular elements are installed, and
        wherein the hierarchical configuration is standardized;
    based on the mapping generated by the ML model, determining a status of the construction of the particular structure,
        wherein the status of the construction includes an estimate of completion of the particular structure;
    obtaining the mapping between the updated construction data regarding the ongoing construction of the particular structure and the hierarchical configuration including an incorrect mapping; and
    retraining the ML model using the mapping between the updated construction data regarding the ongoing construction of the particular structure and the hierarchical configuration.

2. The computer-implemented method of claim 1, wherein at least a portion of the multiple mappings are analyzed based on metadata associated with the elements of the structures or the construction activities for the structures and corresponding metadata associated with the multiple elements or the associated construction activities in the hierarchical configuration.

3. The computer-implemented method of claim 1, wherein the estimate of the completion of the particular structure includes an estimate of remaining time to the completion of the particular structure or an estimate of future costs associated with the construction of the particular structure.

4. The computer-implemented method of claim 1, further comprising:
predicting, based on the ML model, a delay in the completion of the particular structure relative to an expected completion of the particular structure.

5. The computer-implemented method of claim 1, further comprising:
estimating, based on the ML model, a delay in progress of the construction of the particular structure at a point in time relative to an expected progress of the construction of the particular structure at the point in time.

6. The computer-implemented method of claim 1, further comprising:
predicting, based on the ML model, a cost to complete the construction of the particular structure relative to an expected cost to complete the construction of the particular structure.

7. The computer-implemented method of claim 1, further comprising:
estimating, based on the ML model, a cost of the construction of the particular structure at a point in time relative to an expected cost of the construction of the particular structure at the point in time.

8. The computer-implemented method of claim 1, wherein the status data includes sensor data based on sensor scans of the particular structure, the sensor data comprising LIDAR data, image data, or both.

9. The computer-implemented method of claim 1, wherein at least some of the defined unidirectional paths of the hierarchical configuration do not include paths between the branches.

10. The computer-implemented method of claim 1, wherein at least some of the defined unidirectional paths of the hierarchical configuration are associated with weights indicating a degree to which an element affects a progress of construction.

11. The computer-implemented method of claim 1, wherein each of the respective levels of the branches of the hierarchical configuration includes one type of element of the types of elements.

12. The computer-implemented method of claim 1, further comprising:
searching the database storing the construction data based on a change in an element of a particular branch of the hierarchical configuration to determine an effect on a different element in the particular branch,
wherein the search is in accordance with the defined unidirectional paths.

13. The computer-implemented method of claim 1, wherein at least some of the defined branches include subbranches.

14. A non-transitory computer-readable medium carrying instructions that, when executed by a computing system, cause the computing system to perform operations to evaluate progress of a structure undergoing construction in near-real time, the operations comprising:
receiving building information modeling (BIM) data in a non-standardized format for a set of structures undergoing construction,
wherein the BIM data for each structure includes digital drawings of elements of the structure;
receiving scheduling data associated with construction of each structure in the set of structures,
wherein the scheduling data for each structure includes an expected progress of construction at different points in time;
accessing a database storing construction data that associates multiple elements of construction projects in a hierarchical configuration,
wherein the hierarchical configuration defines branches that each have one or more types of elements including a group and a system, a subsystem, a component, or a subcomponent at respective levels, and
wherein the hierarchical configuration defines unidirectional paths between the levels of the branches;
generating, based on the BIM data and the scheduling data, a machine learning (ML) model that standardizes how particular elements of a particular structure relate to the multiple elements in the hierarchical configuration,
wherein the ML model is trained based on a training dataset including multiple mappings of elements of structures other than the particular structure or construction activities for the structures to the multiple elements or the associated construction activities in the hierarchical configuration;
receiving updated construction data regarding an ongoing construction of the particular structure,
wherein the updated construction data indicates current states of at least some of the particular elements, and
wherein the updated construction data regarding the ongoing construction of the particular structure is in the non-standardized format; and
using the ML model, trained based on the training dataset including multiple mappings of elements of structures other than the particular structure or construction activities for the structures to the multiple elements or the associated construction activities in the hierarchical configuration, generate a mapping between the updated construction data regarding the ongoing construction of the particular structure and the hierarchical configuration,
wherein the construction data indicates whether the particular elements are installed, and
wherein the hierarchical configuration is standardized;
based on the mapping generated by the ML model, determining a status of the construction of the particular structure;
obtain the mapping between the updated construction data regarding the ongoing construction of the particular structure and the hierarchical configuration including an incorrect mapping; and
retrain the ML model using the mapping between the updated construction data regarding the ongoing construction of the particular structure and the hierarchical configuration.

15. The non-transitory computer-readable medium of claim 14, wherein the status of the construction of the particular structure includes an estimate of completion of the particular structure comprising an estimate of remaining time to the completion of the particular structure or an estimate of future costs associated with the construction of the particular structure.

16. A computing system, comprising:
at least one hardware processor; and
at least one non-transitory memory carrying instructions that, when executed by the computing system, cause the computing system to:

receive building information modeling (BIM) data in a non-standardized format for a set of structures undergoing construction,
   wherein the BIM data for each structure includes digital drawings of elements of the structure;
receive scheduling data associated with construction of each structure in the set of structures,
   wherein the scheduling data for each structure includes an expected progress of construction at different points in time;
access a database storing construction data that associates multiple elements of construction projects in a hierarchical configuration,
   wherein the hierarchical configuration defines branches that each have one or more types of elements including a group and a system, a subsystem, a component, or a subcomponent at respective levels, and
   wherein the hierarchical configuration defines unidirectional paths between the levels of the branches;
generate, based on the BIM data and the scheduling data, a machine learning (ML) model that standardizes how particular elements of a particular structure relate to the multiple elements in the hierarchical configuration,
   wherein the ML model is trained based on a training dataset including multiple mappings of elements of structures other than the particular structure or construction activities for the structures to the multiple elements or the associated construction activities in the hierarchical configuration;
receive updated construction data regarding an ongoing construction of the particular structure,
   wherein the updated construction data indicates current states of at least some of the particular elements, and
   wherein the updated construction data regarding the ongoing construction of the particular structure is in the non-standardized format;
using the (ML) model, trained based on the training dataset including multiple mappings of elements of structures other than the particular structure or construction activities for the structures to the multiple elements or the associated construction activities in the hierarchical configuration, generate a mapping between the updated construction data regarding the ongoing construction of the particular structure and the hierarchical configuration,
   wherein the construction data indicates whether the particular elements are installed, and
   wherein the hierarchical configuration is standardized;
   based on the mapping generated by the ML model, determining a status of the construction of the particular structure;
obtain the mapping between the updated construction data regarding the ongoing construction of the particular structure and the hierarchical configuration including an incorrect mapping; and
retrain the ML model using the mapping between the updated construction data regarding the ongoing construction of the particular structure and the hierarchical configuration.

17. The computing system of claim 16, wherein the status of the construction of the particular structure includes an estimate of completion of the particular structure comprising an estimate of remaining time to the completion of the particular structure or an estimate of future costs associated with the construction of the particular structure.

18. The computing system of claim 16, wherein the instructions further cause the computing system to:
   estimate, based on the ML model, a delay in progress of the construction of the particular structure at a point in time relative to an expected progress of the construction of the particular structure at the point in time;
   identify a level or a group within the hierarchical configuration associated with the estimated delay in the progress of construction; and
   evaluate performance of the level or the group within the hierarchical configuration based on the estimated delay in the progress of the construction,
      wherein evaluating the performance of the level or the group includes generating a performance metric.

\* \* \* \* \*